Oct. 21, 1952
R. H. PREWITT
2,614,636
ROTOR PARACHUTE
Filed April 12, 1947
3 Sheets-Sheet 1
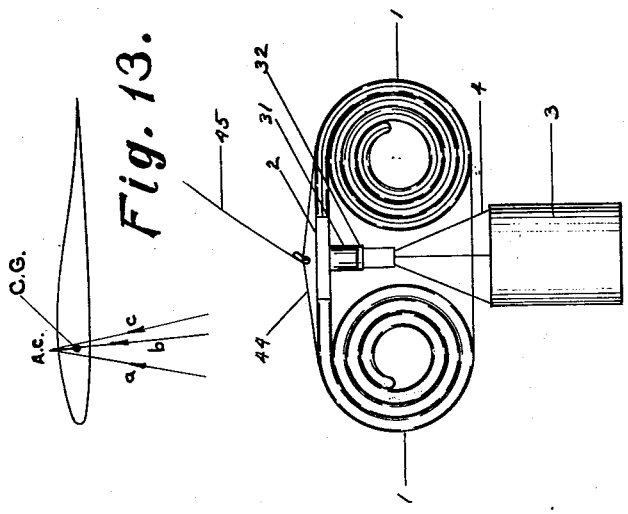
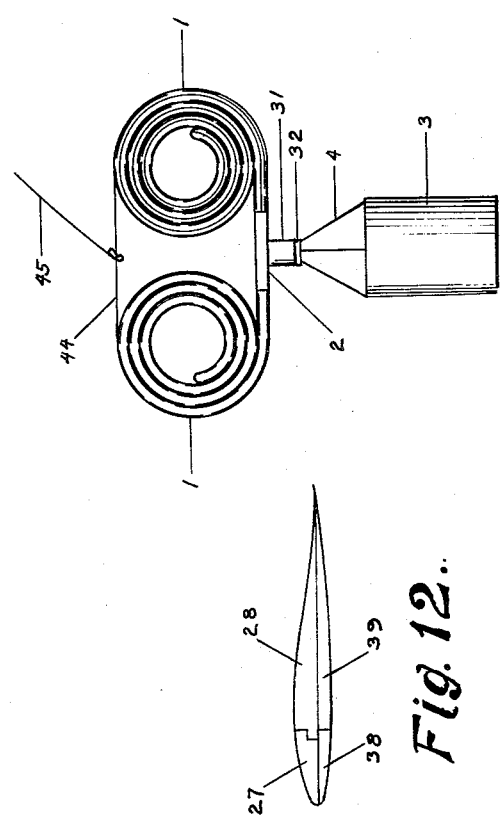
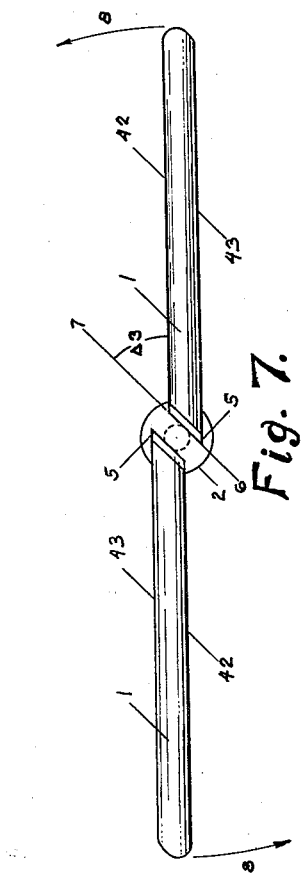
INVENTOR
Richard H. Prewitt,
BY
Barr, Borden & Fox
ATTORNEY

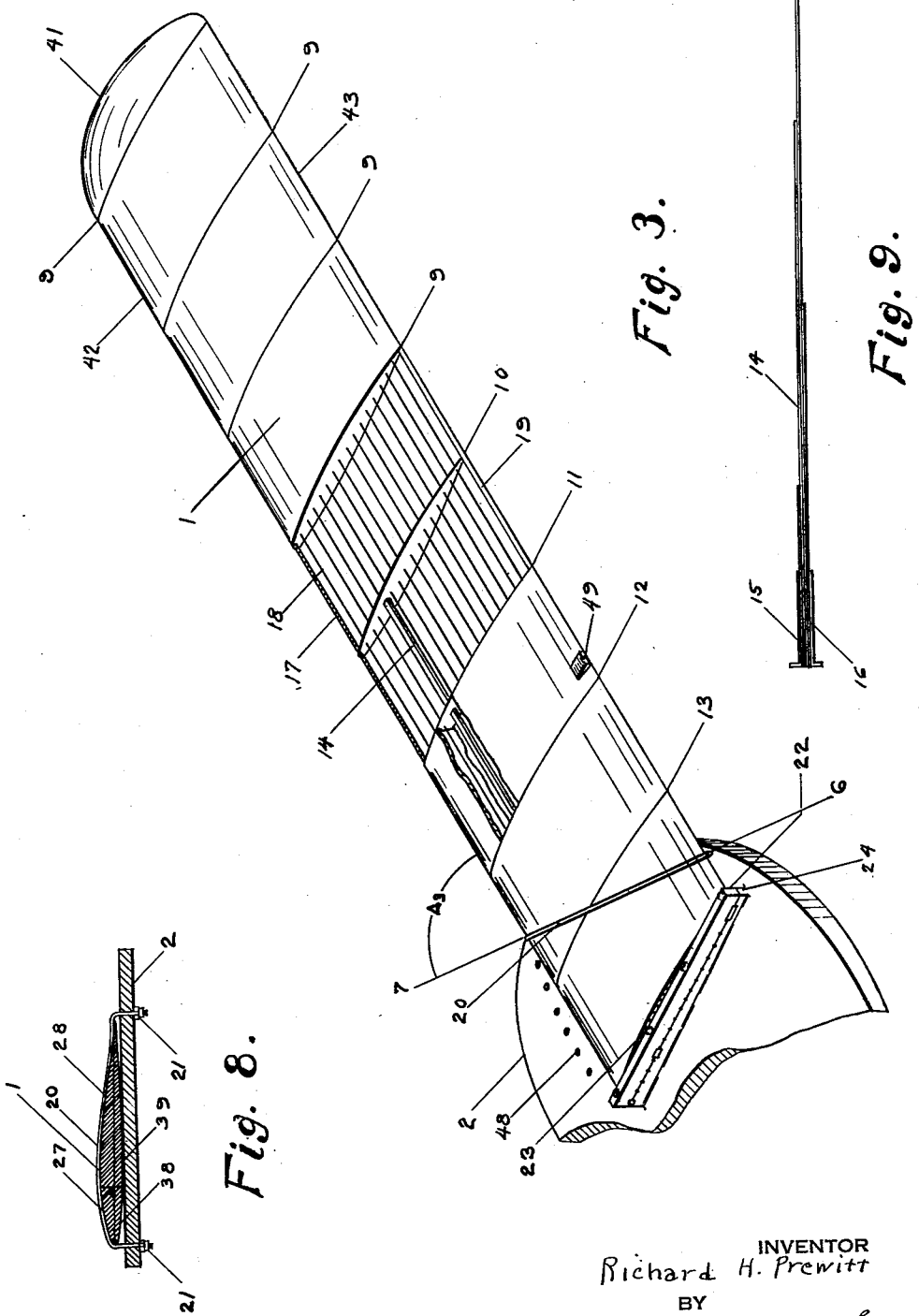

Oct. 21, 1952 R. H. PREWITT 2,614,636
ROTOR PARACHUTE

Filed April 12, 1947 3 Sheets-Sheet 3

INVENTOR
Richard H. Prewitt
BY
Barr, Borden & Fox
ATTORNEY

Patented Oct. 21, 1952

2,614,636

UNITED STATES PATENT OFFICE 2,614,636
ROTOR PARACHUTE

Richard H. Prewitt, Wallingford, Pa.

Application April 12, 1947, Serial No. 741,025

12 Claims. (Cl. 170—160.11)

1

This invention relates to motorless aircraft. In particular, it may be called a "Rotorchute," wherein auto-rotating blades are utilized in place of a canopy for lowering a load from an aircraft to the ground, or, with minor modifications, it may be utilized in towing a load from behind another aircraft, for transporting the load to a desired location for release prior to descending to the ground. In particular, the Rotorchute described in this invention incorporates flexible blades. For compactness in storage and to minimize damage when being ejected from an aircraft in flight, the blades are rolled and properly tied in position until deployment. At deployment, the Rotorchute initially is activated in windmill fashion, which, in turn, establishes centrifugal forces on the blades and eventually is airborne in autorotation where the lift forces are balanced by the normal component of centrifugal forces.

In particular, the following specifications and drawings describe this invention in more detail:

Fig 1 is an elevation of the invention, showing the blades rolled above the hub.

Fig. 2 is another elevation of the invention, showing the blades rolled below the hub.

Fig. 3 is a plan view isometric and cutaway sketch of the blade, its hub attachment and a broken view of the hub.

Fig. 7 is a plan view of the unit shown in Figs. 1 and 2, at reduced scale, but with the blades outstretched.

Fig. 8 is a sectional view taken along the line 6—7.

Fig. 9 is an elevational view of the stiffening member located internally at the inboard end of the blade.

Fig. 12 is provided to illustrate diagrammatically the relative dispositions of yieldable and/or elastic materials which may be used in the various parts of the blade section shown in Fig. 5.

Fig. 13 shows diagrammatically the chordwise CG of the airfoil section of the blade and the related aerodynamic forces resulting from its shape.

Figure 4:
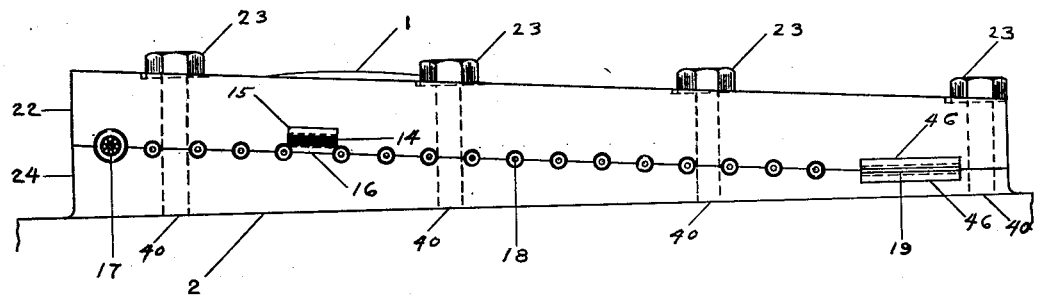
Fig. 4 is a view of the blade anchor looking outboard.

With reference to Figs. 1 and 2, blades 1 are

2 rolled above the hub and held in place through ripcord 44 and static line 45. Blades 1 are firmly attached to hub 2, which also carries cylindrical member 31. Container 3 is supported through members 4 to disc 32 which is permitted to turn within hub cylindrical member 31. The right-hand view of Figs. 1 and 2 shows the trailing edge of blade 1, and the left-hand side of Figs. 1 and 2 shows the leading edges of blade 1.

Referring to Fig. 7, blades 1, having leading edges 42 and trailing edges 43, turn in the direction indicated by the arrows 8. Blades 1 are attached to hub 2 at 5. The attaching member 5, in combination with the straightening action of the centrifugal tension acting on the blade, creates an effective blade hinge along the line 6—7, which may form an acute angle delta three with the blade longitudinal axis measured to the leading edge side of the blade, or the angle delta three may be an obtuse angle by changing the hub and direction of the line 6—7 created through the attaching members 5, depending upon desired operational conditions more fully described hereafter.

Referring to Fig. 3, blade 1, having leading edge 42, trailing edge 43, and tip 41, is fabricated with chordwise stiffening rib members 9, 10, 11, 12, and 13. Outboard rib members 9 are similar, but inboard rib members 10, 11, 12, and 13 are provided with an additional aperture near the leading edge to accommodate spring member 14. Leading edge cable 17, trailing edge stiffening member 19, and cable or wire members 18 extend longitudinally of the blade from the inboard attachment fitting 22 to the blade tip 41. Yieldable material completes the airfoil shape between ribs 9, 10, 11, 12, and 13, as well as the inboard portion beyond rib 13. This material may be of a combination cork and resin, cork and rubber, pure rubber, or other suitable material. Its main purpose is to provide proper external airfoil shape and to transmit the air loads to the longitudinally extending members described above, while being longitudinally lithe, i. e. capable of being easily bent, pliant, limber, flexible, at least spanwisely.

When the Rotorchute is in operation; i. e. rotating at good speed, such as in autorotation, the longitudinal structural members, including the leading edge cable 17, wires or cables 18, and trailing edge strap 19, will be under heavy centrifugal loads, which will tend to keep them straight between rib members 9, 10, 11, 12 and 13, where they are each individually fixed at these members, which maintain proper chordwise shape. Thus, the material which is attached to said longitudinal structural members is positionally established internally and therefore the airfoil shape will not greatly deviate from its initial designed form.

As described for Fig. 7, above, the angle delta three may be altered as desired to meet the various conditions which might be encountered in different types of application; as, for example, deployment at high speed or deployment at low speed, or altering the speed at which the rotor accelerates at a given deployment speed. Strap 20, an addition to the disclosure of Fig. 7, shown in more detail in Fig. 8, is provided, to create the proper angle delta three, and with suitable assortment of holes 48 in hub plate 2 the effective angle delta three can be varied as desired. Such changes in location of strap 20 may require a reshaping of this member to fit the new contour, since the strap will pass over the shaped upper surface of the blade at a different angle. Plate 22 is bolted to a mating surface 24 extending up from hub 2 through bolts 23. The center of gravity of the inboard end of the blade may be brought aft by weight 49 to obtain desired blade operation as described in detail hereinafter.

With reference to Fig. 8, strap 20 extends over the blade 1 and down through hub plate 2 where it is anchored by nuts 21.

It may be found desirable to use a different type of filler material between the leading edge of the airfoil and the trailing edge of the airfoil, as at 27 and 28, or between the upper section of the airfoil and the lower section of the airfoil, as between 27 and 38, or 28 and 39, depending upon balance requirements for specific applications, and also other considerations, such as blade efficiency, temperature requirements, etc.

Fig. 9 is a detail elevational view of the stiffening spring member 14 shown in Fig. 3. As illustrated, it is made up of a series of rectangular sections of springlike material, such as spring steel, suitably bonded together to operate as a unit. It may be noted that the inboard end carries angularly shaped or flanged members 15 and 16, which forms a means of anchoring the spring member 14 to transmit its centrifugal tension to the hub.

Fig. 4 shows the means of anchoring the inboard end of blade 1. Hub member 2 carries projection 24, which mates with fitting 22. Along the mating surface between members 22 and projection 24 suitable slots and counterbores are provided for cable 17, trailing edge 19 and wire or cable members 18. In addition, a rectangular aperture is provided for spring member 14, anchored in place by projections 15 and 16. Likewise a suitable slot is provided for trailing edge member 19, which is held in position by projection members 46. Member 22 is held in place through stud members 40 and nuts 23.

Figure 10:
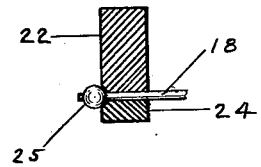
Fig. 10 is a sectional view of the anchors shown in Fig. 4.

A sectional view of Fig. 4 is shown in Fig. 10, where projecting member 24 lies below cable member 18 and ball anchor fitting 25 and member 22 lies above said cable and anchor ball. Anchor ball 25 is swaged to cable 18 in such manner as to transmit all of the centrifugal tension in cable member 18, as shown, and in nose cable 17, not shown, but similarly attached to hub projection 24 and member 22. The centrifugal tension in spring member 14 and trailing edge member 19 is transmitted to hub projection 24 and member 22 through suitably formed projections 15 and 16 for spring member 14 and 46 for trailing edge member 19.

Figure 5:
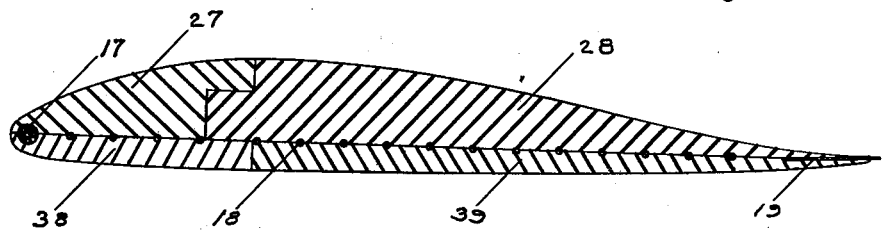
Fig. 5 is a section of the blade in an outboard region.

Fig. 5 shows a sectional view through an outboard section of the blade. The longitudinal structural members are shown as the leading edge cable 17, cable or wire members 18 and trailing edge member 19, all of which lie substantially along a straight line, so that these structural members are not greatly elongated or shortened when the blade 1 is rolled.

With reference to Fig. 12, the area within the blade section is divided into leading edge sections 27, upper, and 38, lower. It is proposed to employ varying materials at different sections of the blade, noted above, in order to cause the blade to balance properly chordwise, and to provide desirable elastic properties for the various operations of the blade. For example, in order to bring the center of gravity of the blade forward, it may be desirable to utilize relatively heavy materials, such as solid rubber, in the leading edge sections 27 and 38, and a relatively light material in the aft sections 28 and 39. Again it may be desirable to utilize a high damping material for the upper sections 27 and 28, and a pre-stressed highly elastic material for portions 38 and 39, (such distribution of materials may extend only over a portion of the blades, or only in a portion of the areas 27, 28, 38 and/or 39); or again it may be desirable to utilize a light material for sections 27 and 28 and a highly elastic material for portions 38 and 39, depending upon the specific applications; i. e., deployment at high or low speeds, and desired rate of acceleration, yet maintaining proper chordwise balance.

Figure 6:
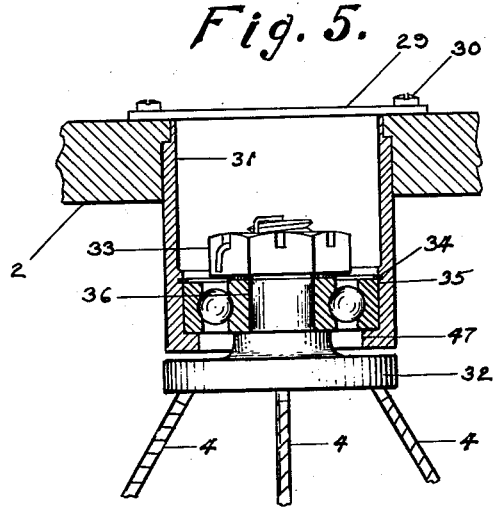
Fig. 6 is a sectional view of the hub.

Fig. 6, a sectional view of the hub, shows hub member 2, to which is fixedly attached cylindrical member 31, which carries internally bearing 35 secured from vertical movement through projection 47 and retainer ring 34. Structural members 4 are fixed to disc member 32 which carries axle 36 for bearing 35. Nut 33 secures disc member 32 to the inner part of bearing 35. Cover plate 29 is secured to hub 2 through suitable fastener 30.

Figure 11:
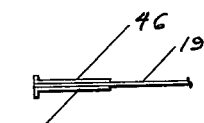
Fig. 11 is a fragmentary elevational view of the inboard anchor of trailing edge member 19.

Fig. 11 shows a detail at the inboard anchor attachment of trailing edge member 19. Anchor members 46 are securely attached to trailing edge member 19 and provide an anchor for same.

Fig. 13 shows the chordwise CG of the blade at CG located underneath the aerodynamic center AC. The air load vectors marked (a), (b), and (c) represent the total air load operating on the blade at various angles of attack; i. e., vector (a) represents the loading when the blade is operating at a low angle of attack. Vector (b) represents the airload action on the blade when it is operating at a normal, or greater than normal, angle of attack, and vector (c) represents the airload acting on the blade when it is operating at a high angle of attack prior to stall. Thus, it may be seen that when the blade is operating at a high angle of attack below the stall, a small moment is created about the chordwise CG of the blade, tending to lower the leading edge and raise the trailing edge. Conversely, when the blade is operating at a low angle of attack, represented by vector (a), there is a moment around the chordwise CG of the blade tending to raise the leading edge and lower the trailing edge of the blade, which would have the effect of increasing the angle of attack. It can readily be seen that a selected airfoil having the characteristics illustrated would, neglecting other forces, have a tendency to float stably at the angle of attack represented by the vector (b) which passes directly through the chordwise CG of the blade, which may be slightly aft of a line extending directly underneath the aerodynamic center AC.

In addition to the aerodynamic stabilizing forces taught above, there are two centrifugal stabilizing forces in operation; first, there is that centrifugal stabilizing force commonly known in centrifugal-propeller design, which tends to keep the chordwise distributed weight of the blade in the plane of rotation; and secondly, due to the chordwise spreading of the longitudinally extending strength members 17, 18, and 19, an additional stabilizing force is created which tends to keep the tip of the blade in line with the root of the blade, as any twisting would tend to move the blade elements closer to the hub against the centrifugal forces while operating. In order to offset the last two stabilizing forces it may be found desirable to place the chordwise center of gravity aft of the position illustrated in Fig. 13, with the longitudinally disposed strength members 17, 18, and 19 lying substantially in the plane of the disc at the hub, or I may choose to set the aforementioned longitudinally disposed strength members 17, 18, and 19 at a positive angle of attack at the hub, and the chordwise CG further ahead.

Such a device as described in this invention must be free from destruction due to handling loads. It must start windmilling and proceed into autorotation as desired for the different conditions of operation, i. e., deployment at low speed, or deployment at high speed. Likewise it must descend with stability. The disclosure of this invention recites the various means to accomplish the desired results. For example, the leading edge of the blade has greater resistance to deflection, as in rolling the blade up, then the trailing edge, since the leading edge longitudinal stiffening members, including the specific stiffening member 14, are designed to be stiffer than the trailing edge longitudinal structural members, including the flat trailing edge member 19. Likewise, the filler material used between the ribs and attached to the longitudinal structural members may have greater resistance to bending in the leading edge portion of the blade than in the trailing edge portion of the blade. With this device, upon deployment, the leading edge of the blade will be forced down to a greater extent than the trailing edge when the blade is reacted on by air forces prior to establishing autorotation. It may be seen that the air forces will act upward on the blade centered at a point approximately halfway between the leading edge and the trailing edge and, by maintaining greater resistance to these air forces at the leading edge, the blade will tend to twist near the hub into a lower angle of attack, thus providing initial windmilling prior to establishing autorotation. When the rotor starts to turn centrifugal forces will act on the elements of the blade, causing the blade to become balanced in a cone position, depending upon the relationship of the aforementioned centrifugal forces tending to keep the blades outstretched and the air loads tending to bow the blades upwind against the aforementioned resilient forces and centrifugal forces.

It is desired that a Rotorchute dropped from an aircraft traveling at low speed accelerate into autorotation rapidly, and therefore, for low speed operation, it would be desirable for the blade to initially twist through approximately 45° negative angle, and for said angle to progressively increase to a slight positive angle when autorotation has been established.

When deployment occurs at high speed, it is desired that the transfer into autorotation be delayed sufficiently to prevent excessive shock loads on the pilot or material which is being lowered to the ground. In this case there are two possible methods of accomplishing the desired result. One is to cause the blades to be twisted as described above to an excessively small angle of attack, such that the windmilling speed of the rotor would be limited; and the other method would be to cause the rotor to go to a relatively high angle of attack, which would preclude autorotation so long as high velocity or high load factors existed. The former method of delaying autorotation is automatically accomplished by the methods described above for slow speed deployment. However, this can also be accomplished by the latter method, where a weight located near the trailing edge of the blade, as at 49, would be used to take advantage of the high accelerations, and thereby create a downward force on the trailing edge to counteract the negative twisting of the blade due to the interaction of forwardly located stiffness in relation to centrally located air loads. With such a weight installed, creating a more rearward CG of the airfoil, such as might place the airfoil CG at a distance halfway between the leading edge and trailing edge, then no moments would be created as a result of inertia loads. Such moments would then be purely a relationship between air loads and the resistance of the blade in bending, and by placing the CG slightly aft of the initial center of pressure of the air load, the twisting moments created by the bending stiffness of the blade toward the leading edge would be partially offset. Thus, the chordwise CG near the inboard end of the blade, as well as the chordwise position of the center of resistance to bending of the blade, each form an important part in determining the characteristics of the Rotorchute during deployment, with special reference to the rapidity at which it goes into autorotation.

In addition to the above, it may be desirable to incorporate prestretched or pre-compressed filler materials in the blade, or pre-formed structural material in the blade, so disposed and arranged to cause the blade to deform locally under the influence of such resilient materials. Yet when the Rotorchute incorporating these devices goes into autorotation, with accompanying centrifugal loads, the effect of such deforming devices will be greatly minimized by the counter effect of the centrifugal loads tending to straighten the blade. These deforming devices may therefore be particularly effective in the initial stages prior to attaining autorotation.

The cocking of the delta three angle (illustrated in Fig. 3 and Fig. 7) has a profound effect upon the operation of the Rotorchute. With a delta three angle less than 90°, the blade will tend to decrease its angle of incidence as it progresses into a higher coning angle, and this would have a tendency to increase the autorotational speed, which, in turn, through greater centrifugal tension, would tend to lower the coning angle of the blade. Initially after deployment, but before autorotation, blades mounted with an acute delta three angle would have a tendency to lower the blade pitch with higher coning angle; yet at the same time the tip of the blade moves forward, creating a component of wind forces onto the leading edge of the blade. The tendency of the blade to decrease its angle of incidence due to an acute delta three angle would tend to create a positive driving force toward proceeding into autorotation, and the aforementioned component of drag force acting on the leading edge of the blade tends to create a negative driving force and one which would tend to retard acceleration of the rotor.

Conversely, a delta three angle greater than 90° would have a tendency to go to higher pitch angles with increased coning, and the blade would tend to move aft toward the tip, thereby creating a component of air force from trailing edge to leading edge. The increased incidence angle of the blade created by a delta three angle greater than 90° would tend to retard acceleration of the rotor, yet the component of air forces directed from trailing edge to leading edge would tend to accelerate the rotor. The resulting accelerating or decelerating forces must not only take into account the relative coning angle but also the relative value of torque moment forces between the aerodynamic resistance when the air is impinging on the flat face of the blade and the aerodynamic resistance when the air is impinging on the blade chordwisely. By careful selection of the angle delta three, based on the principles taught above, in combination with the distribution of blade flexibility previously discussed, it is possible to obtain the desired Rotorchute characteristics for any given application.

It is understood that this invention is not limited to the airfoil shapes and dimensions shown herein, and that other shapes may be employed to attain the desired results.

Having thus described my invention, I claim:

1. In rotary wing aircraft, a hub, a longitudinally lithe blade, means operatively associated with the blade to render it stiff chordwisely and flexible longitudinally, said blade having a longitudinal axis, a bending edge strap straddling said blade, and complemental means on the strap and hub to hold the strap rigidly in a selected one of a plurality of positions in overlying relation to the blade, to establish a selected line of flexure of the blade angular relative to the longitudinal axis thereof establishing the delta three angle of the blade and thus predetermining the operating characteristics of the blade when first deployed.

2. In a rotary wing aircraft, a longitudinally lithe blade comprising a flexible structural member extending longitudinally of the blade, a plurality of longitudinally spaced chordwisely extending structural members each of substantial stiffness mounted on the said flexible member, and a supplemental resilient device located in said blade closer to the leading edge than to the trailing edge and of generally progressive variation in stiffness in its length decreasing from the root of the blade for rendering the blade resiliently stiffer toward the leading edge than toward the trailing edge so as to enhance deployment and windmilling without precluding coiling of the blade.

3. In a rotary wing aircraft, a longitudinally lithe blade comprising a flexible structural member extending longitudinally of the blade, a plurality of longitudinally spaced chordwisely extending structural members each of substantial stiffness mounted on the said flexible member, and a resilient member in the forward portion of the blade comprising a resilient device anchored in the blade root and terminating spanwisely short of the full blade span for rendering the leading edge of the blade resiliently stiffer against coning than the trailing edge thereof without precluding coiling of the blade so that upon deployment the blade can assume a windmilling angle from reaction with the air through which it moves as a preliminary to autorotation.

4. In a rotary wing aircraft, a longitudinally lithe blade arranged for effective coiling, a flexible structural element extending longitudinally of the blade aerodynamically chordwisely asymmetrical thereof, said element being stiffer adjacent to the root of the blade than at its spanwise termination in said blade, whereby upon deployment from its effectively coiled attitude the blade is urged into windmill angles of attack.

5. In a rotary wing aircraft, a longitudinally lithe blade having a longitudinal axis, a resilient structural element extending longitudinally of the blade aerodynamically chordwisely asymmetrical thereof, said element being stiffer adjacent the root of the blade than at its spanwise termination in said blade, a hub, said blade mounted on the hub, and means mounted on said hub and overlying the blade for establishing a line of flexure of the blade relative to said hub at a predetermined acute angle to said longitudinal axis thereof, said structural element and said angle of flexure cooperating to establish the starting torque and operating characteristics of the rotor.

6. In a rotary wing aircraft, a longitudinally lithe blade having a longitudinal axis, a hub, said blade mounted on the hub, means mounted on said hub and engaging the upper surface of the blade to constrict the blade between the hub and said means, said means having a bending edge forming an angle with said longitudinal blade axis about which edge said blade can bend in the rotative functions of the hub and blade establishing a selected line of flexure of the blade relative to said hub at a predetermined acute angle to said longitudinal axis thereof for predeterminedly establishing the starting torque and operating characteristics of the rotor, and means engaging said hub and said bending edge means in a selected angular position relative to said longitudinal blade axis, and means on said hub for mounting said bending edge means in another selected angular position relative to the longitudinal axis of said blade to vary the line of flexure of the blade to change the operating characteristics of the rotor.

7. In rotary wing aircraft, a flexible blade, a hub, means attaching the root of the blade to the hub with the latter partially overlying the hub, means for establishing the delta three angle of the blade comprising a clamp overlying the blade and forming with the hub a device for constricting the blade about a line of flexure established by the clamp, and complemental means on the hub and clamp for attaching the clamp and hub together so that the clamp is in a predetermined angular relation to the longitudinal axis of the blade to predetermine the operating characteristics of the blade upon deployment.

8. In rotary wing aircraft, a blade formed of multiple structural elements and being longitudinally lithe and susceptible to coiling, uncoiling, windmilling and autorotation, said blade incorporating a first and a second material of respectively different elastic characteristics, said materials being differentially pre-stressed and disposed in relative effective contiguity, the materials and stressing causing inherent local deformation of the blade.

9. Rotary wing aircraft as claimed in claim 8 in which the first and second materials are both in the upper portion of the blade.

10. Rotary wing aircraft as claimed in claim 8 in which the first and second materials are both in the lower portion of the blade.

11. Rotary wing aircraft as claimed in claim 8 in which the first and second materials are respectively in the entering and trailing edges of the blade.

12. In rotary wing aircraft, a blade formed of multiple structural elements and being longitudinally lithe and susceptible to coiling, uncoiling, windmilling and autorotation, said blade incorporating a first and second and a third and fourth material, in respective pairs, said materials of each pair being of respectively different elastic characteristics, said materials of each pair being differentially prestressed and disposed in mutual relative effective contiguity, the materials and stressing causing inherent local deformation of the blade.

RICHARD H. PREWITT.

REFERENCES CITED

The following references are of record in the file of this patent:

UNITED STATES PATENTS

| Number | Name | Date |
|---|---|---|
| 2,226,078 | Pescara | Dec. 31, 1940 |
| 2,234,319 | Preston | Mar. 11, 1941 |
| 2,330,803 | Andrews | Oct. 5, 1943 |
| 2,404,678 | Wuensch | July 23, 1946 |

FOREIGN PATENTS

| Number | Country | Date |
|---|---|---|
| 399,607 | Great Britain | Oct. 12, 1933 |
| 660,793 | Germany | June 2, 1938 |
| 800,738 | France | May 11, 1936 |